United States Patent
Kim

(10) Patent No.: US 8,396,388 B2
(45) Date of Patent: Mar. 12, 2013

(54) SYSTEM AND METHOD FOR CONTROLLING OPERATION OF A PRINTER BY USING AN EXTERNAL MEMORY

(75) Inventor: Do-hyung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1049 days.

(21) Appl. No.: 11/312,931

(22) Filed: Dec. 21, 2005

(65) Prior Publication Data

US 2006/0146355 A1 Jul. 6, 2006

(30) Foreign Application Priority Data

Dec. 30, 2004 (KR) .................. 10-2004-0116298

(51) Int. Cl.
*G06F 3/12* (2006.01)
(52) U.S. Cl. ......... 399/80; 358/1.13; 358/1.14; 709/229
(58) Field of Classification Search .................. 358/1.13, 358/1.14; 399/80; 709/229
See application file for complete search history.

(56) References Cited

U.S. PATENT DOCUMENTS

| | | | | |
|---|---|---|---|---|
| 4,900,902 A | * | 2/1990 | Sakakibara | .................. 235/375 |
| 5,608,494 A | * | 3/1997 | Ogura et al. | .................. 399/366 |
| 6,202,092 B1 | * | 3/2001 | Takimoto | .................. 709/225 |
| 7,027,172 B1 | * | 4/2006 | Parulski et al. | .............. 358/1.15 |
| 7,227,658 B2 | * | 6/2007 | Dorfman et al. | ............. 358/1.15 |
| 7,487,233 B2 | * | 2/2009 | Iwamoto et al. | .............. 709/223 |
| 7,865,725 B2 | * | 1/2011 | Choi | ............................ 713/166 |

FOREIGN PATENT DOCUMENTS

| | | |
|---|---|---|
| JP | 04-107165 | 4/1992 |
| JP | 2000-062294 | 2/2000 |
| JP | 2002-059612 | 2/2002 |
| KR | 1020010088530 | 9/2001 |
| KR | 10-2004001356 | 2/2004 |

\* cited by examiner

*Primary Examiner* — Steven Kau
*Assistant Examiner* — Peter K Huntsinger
(74) *Attorney, Agent, or Firm* — Roylance, Abrams, Berdo & Goodman, LLP

(57) ABSTRACT

Provided is printer operation control system and method for a printer having diverse print functions by using an external memory. The external memory is used to store information on the availability of each print function. A reader is provided for reading the information on the availability of each print function stored in the external memory. Further, a function setting unit is provided for setting up the operability of software for each print function based on the information read in the reader. Even further, a controller is provided for controlling the operation of the printer based on the operability of each software set up in the function setting unit.

17 Claims, 4 Drawing Sheets

FIG. 2

| EXTERNAL MEMORY ||
| --- | --- |
| PRINT FUNCTIONS | AUTHENTICATION LEVEL |
| PS3 EMULATION | 2 |
| PCL EMULATION | 1 |
| EPSON EMULATION | M |
| KSSM EMULATION | M |
| MANUAL MODE | 1 |
| DUPLEX PRINTING | M |
| PRINTING WITHOUT MARGINS | 2 |
| MULTIPAGES-ON-ONE-PAGE PRINTING | 1 |
| TONER SAVING | 2 |
| PAPER TYPE | 2 |
| COPY | M |

EXTERNAL MEMORY AUTHENTICATION LEVEL : 1st LEVEL

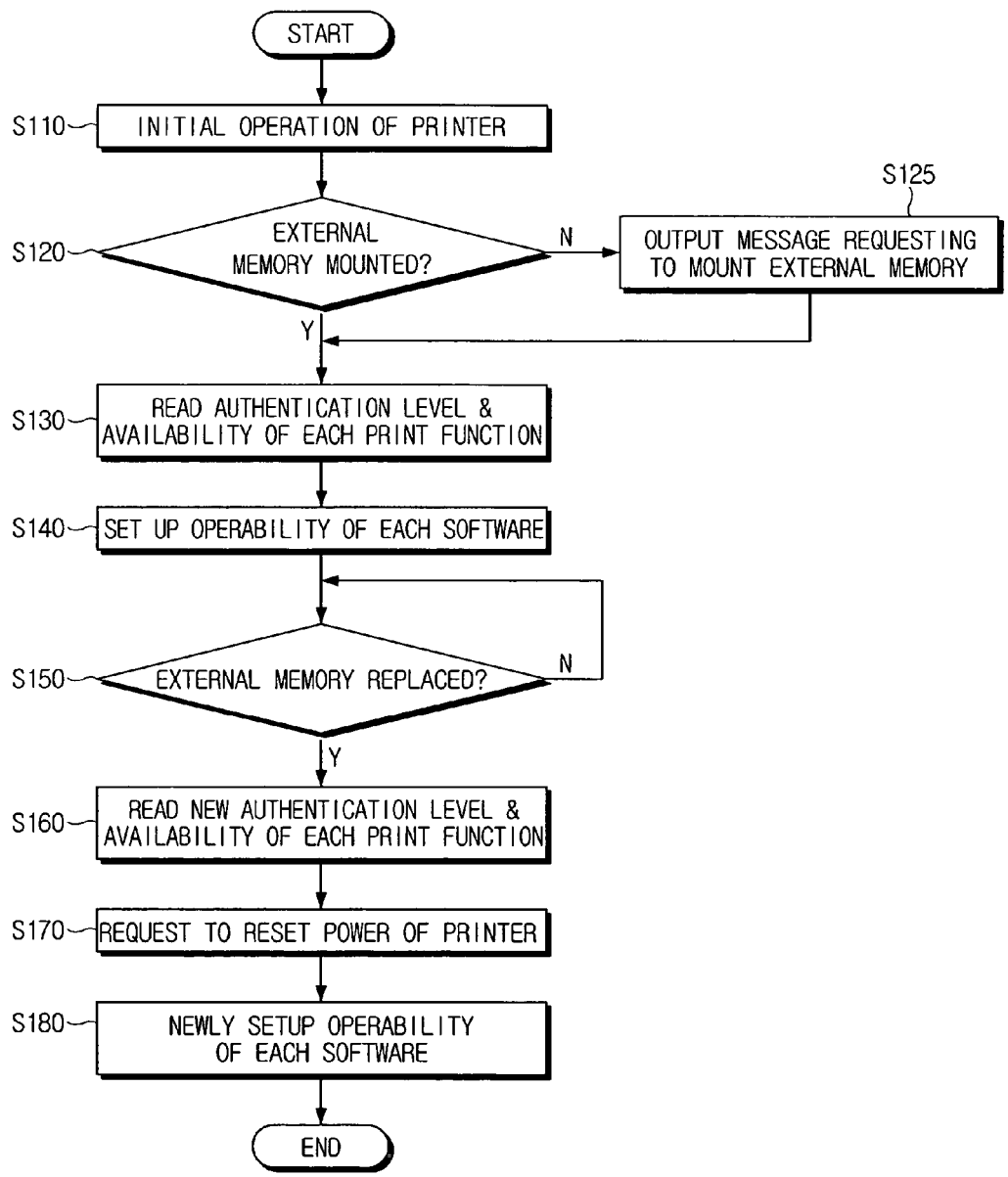

SYSTEM AND METHOD FOR CONTROLLING OPERATION OF A PRINTER BY USING AN EXTERNAL MEMORY

CROSS-REFERENCE TO RELATED APPLICATIONS

This application claims the benefit under 35 U.S.C. §119(a) of Korean Patent Application No. 2004-116298, filed Dec. 30, 2004, the entire disclosure of which is hereby incorporated by reference.

BACKGROUND OF THE INVENTION

1. Field of the Invention

The present invention relates to a system and method for controlling the operation of a printer by using an external memory. More particularly, the present invention relates to a printer operation control system that controls the operability of each function of a printer, and a method thereof. In doing so an external memory is used that stores printing functions that are associated with different authentication levels. Thereby, the present invention makes it possible for a manager of a printer to more easily manage a printer and for a printer manufacturer to reduce the production cost of a printer.

2. Description of the Related Art

Generally, in an environment where a plurality of printers are used, such as a company, managers want to provide printers efficiently according to the printing requirements of a given department. Each department's printing requirements differ according to its work characteristics. For example, a black and white laser printer will be more useful than a color ink-jet printer for a department doing simple document work. Whereas, a color inkjet printer will be more useful to a department involved in frequent presentations. Providing printers based on work characteristics not only satisfies the personnel of each department but also reduces the overall purchase cost of the printers.

Also, some managers may desire to control functions of a printer according to the level of printer performance needed in a department. For instance, providing a printer with numerous functions to a department that requires a great degree of printer performance while providing a low-cost printer to a department that only requires a low performance printer. However, significant time and effort is required to make a decision on what printer best matches a department's printing and performance requirement.

Accordingly, there is a need for a printer that can be customized to include a purchaser's desired functions according to his needs. In addition, there is a need to reduce the production cost of manufacturing a printer while still providing printers having the functions and specifications as diverse as printers that are currently available.

SUMMARY OF THE INVENTION

An aspect of the present invention is to address at least the above problems and/or disadvantages and to provide at least the advantages described below. Accordingly, an aspect of the present invention is to provide a system and method for controlling the operation of a printer by using an external memory and customizing and designing functions of a printer according to the needs of a printer purchaser to thereby make it possible to manage the printer easily and reduce production cost on the part of a printer supplier.

In accordance with an aspect of the present invention, there is provided a printer operation control system for a printer having diverse print functions by using an external memory. The external memory is used to store information on the availability of each print function. A reader is provided for reading the information on the availability of each print function stored in the external memory. Further, a function setting unit is provided for setting up the operability of software for each print function based on the information read in the reader. Even further, a controller is provided for controlling the operation of the printer based on the operability of each software set up in the function setting unit.

Herein, it is preferred that the external memory stores information on one of a plurality of authentication levels for the external memory, with each of the plurality of authentication levels allowing a different number of available print functions.

Preferably, one of a plurality of authentication levels is a master authentication level that allows use of all print functions and the generation of external memories of lower authentication levels with limited print functions.

Alternatively, the external memory stores only information on available print functions among the diverse print functions.

Preferably, the information on an availability of each print function comprises an authentication level of the external memory and a table comprising a list of all print functions with an associated authentication level for each listed print function.

Preferably, the external memory is a flash memory including at least one of a memory stick, a Secure Digital (SD) card, a Multimedia Card (MMC), a microdrive (MD), compact flash and a media card.

The printer includes a setup slot, for mounting the external memory, that is located inside or on the outside of the printer.

The controller determines whether the external memory is mounted or not during initial operation of the printer.

The printer includes a display for showing an operational state of the printer, and the controller displays a message on the display requesting that the external memory be mounted when the controller determines that during the initial operation of the printer the external memory is not mounted.

In accordance with another aspect of the present invention, there is provided a method for controlling operation of a printer having diverse print functions by using an external memory. The external memory is prepared with stored information on an availability of each print function. The information on the availability of each print function stored in the external memory is read. The operability of software for each print function is set up based on the read information. The operation of the printer is controlled based on the operability of each software.

Preferably, the external memory is further prepared with stored information on one of a plurality of authentication levels for the external memory, each of the plurality of authentication levels allowing a different number of available print functions.

Preferably, the authentication levels for the external memory is a master authentication level that allows use of all print functions and generation of external memories of lower authentication levels with limited print functions.

Preferably, the stored information on an availability of each print function comprises an authentication level of the external memory and a table comprising a list of all print functions with an associated authentication level for each listed print function.

The printer operation controlling method can further include sensing whether the external memory is mounted or not during the initial operation; and if the external memory is not set up, requesting on a display to mount the external memory.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which:

FIG. 2 is an external memory comprising print functions of a printer stored as a print function table in accordance with an embodiment of the present invention;

FIG. 4 is a flowchart describing a printer operation control method in accordance with an embodiment of the present invention.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
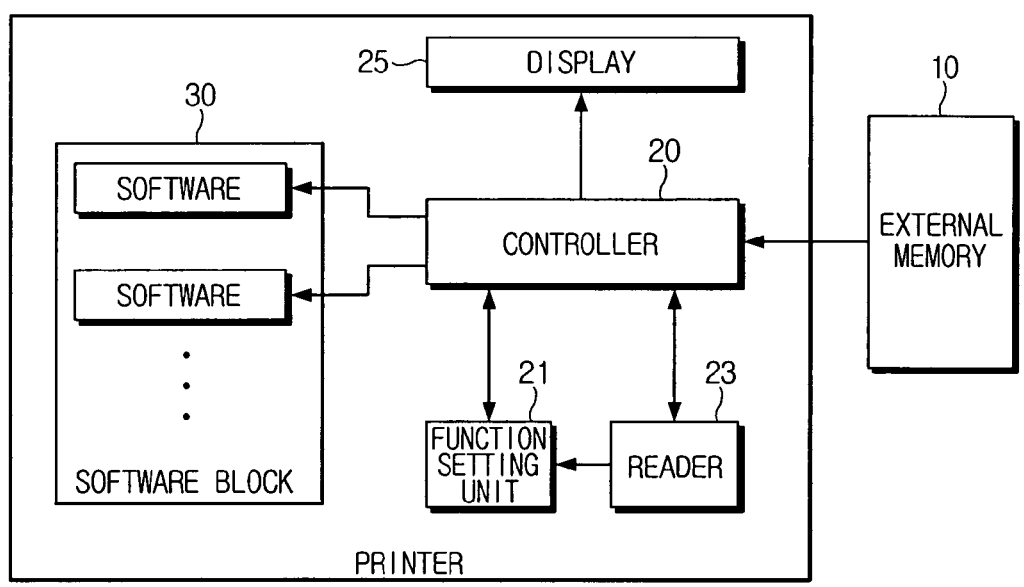
FIG. 1 is a block diagram describing a printer operation control system in accordance with an embodiment of the present invention.

As shown in FIG. 1, the printer operation control system using an external memory 10 includes an external memory 10, a reader 23, a function setting unit 21, a display 25, a controller 20, and a software block 30.

The external memory 10 stores, preferably in the form of a table, information on all types of print functions supported by a printer and information to determine the availability of each print function.

As shown in FIG. 2, the table lists the names of the print functions and their associated authentication level. Also shown is the authentication level of the memory. The authentication levels are used in determining the availability of the print functions.

Herein, the types of print functions include emulation, manual mode, printing on both sides, that is, duplex printing, printing without margins, printing multiple pages on one page, toner saving, paper type setting, and copy.

The function of emulation includes PS3 emulation, PCL emulation, EPSON emulation, and KSSM emulation. The emulations support fonts provided by ADOBE, HP and EPSON, respectively, and the KSSM emulation supports DOS. The manual mode function is for providing paper from a predetermined tray when a corresponding button is selected prior to printing. The duplex printing function is for printing on both sides of a piece of paper. The toner saving function extends the toner's operating life by controlling the quantity of toner used. The printing without margins function is for printing without margins. The multipages-on-one-page printing function is for printing multiple pages on one page. The paper type setting function establishes the type of paper in accordance with the paper's thickness or color.

The function of copy is used to set up the number of pieces of paper to be printed that are duplicates of one another. However, the function of copy is not used by an application program that supports using a driver to set up the number of copies to print. Instead, the function of copy is applied in the case where there is no driver supporting the printing, such as with a DOS file.

The availability of the print functions is determined based on an authentication level associated with each print function and the authentication level of the external memory 10. The authentication level of the external memory 10 and the authentication levels associated with each print function are individually chosen to be one of a plurality of possible authentication levels at the discretion of a printer's manager or supplier.

In an exemplary embodiment, there are three levels of authentication for the external memory 10, such as, a master level, a first level, and a second level. The master level is a level authenticating the use of all print functions. The first level is a level lower than the master level and it allows about two-thirds of the print functions allowed by the master level. The second level is the lowest level and it allows about a one-third of the print functions allowed by the master level. In FIG. 2, the authentication level associated with each print function is marked in the authentication level column next to its associated print function. The print functions available only in the master level are marked as M in the authentication level column, and the print functions available in the first and second levels are marked as 1 and 2, respectively. Herein, the print functions associated with the first and second levels can be performed in the master level, and the print functions associated with the second level can be performed in the first level. The print function table can be stored in the external memory 10 in the same form regardless of the external memory's 10 authentication level. The authentication level of the external memory 10 is stored with the external memory 10 in order to determine the external memory's 10 authentication level.

For example, as illustrated in FIG. 2, when the authentication level of the external memory 10 is the first level, the printer with the external memory 10 can perform the functions associated with the first level, which comprise PCL emulation, manual mode, and multiple pages on one page printing, and the functions associated with the second level, which comprise PS3 emulation, printing without margins, toner saving, and paper type setup.

The manager of a master-level external memory 10 can modify information on the print functions in first or second-level external memories 10. Also, the manager of a master-level external memory 10 can reestablish the functions in first or second-level external memories 10. Also, it is possible for a manager to setup a printer to be used even when the external memory 10 is not mounted in the printer. For this purpose, the manager is given an authentication number.

External memories 10 assigned with first and second levels can be distributed by the manager to each employee or department according to the employee's or department's printing requirement and required level of printing performance. Herein, the concept of a manager is not limited to a person in a company as it can be extended to a printer supplier as well.

Thereby, a printer supplier can provide the same printers at different price points by limiting the print functions according to the price desired by a printer purchaser. For example, if a purchaser wants a relatively expensive product, the supplier provides a printer with a master-level external memory 10, and if the purchaser wants a low-price product, the supplier can provide the printer with an external memory assigned with a first or second level. Herein, it is preferable for a printer supplier that the external memory 10 be mounted inside the printer to prevent the purchaser from easily manipulating the contents of the external memory 10.

The external memory is detachably mounted in a setup slot (not shown) inside or on the outside of the printer and it can be fabricated by using a flash memory card. The types of flash memory cards currently available include MEMORY STICK, SECURE DIGITAL (SD) CARD, MULTIMEDIA CARD (MMC), MICRODRIVE (MD), COMPACT FLASH, SMART MEDIA CARD and the like. Memory cards are used widely, because when compared to other types of memories, they are convenient to use, highly stable, fast in speed, have large capacity and are economical in price.

Among them, MEMORY STICK has been exclusively developed by the Sony Company in 1998 and is optimized for the products of the Sony Company. It is quite stable compared to other memory cards but it has the shortcomings of being expensive, slow, and having limited capacity.

COMPACT FLASH is large compared to other memory cards. This is because it includes a flash memory chip for storing data and a controller chip for transmitting the data to a computer. However, it is the most stable, fastest and least expensive of the flash memories.

MICRODRIVE has an advantage that it is the least expensive high-capacity memory. However, it is easily broken by an external impact and it does not work properly at a low temperature.

The SECURE DIGITAL CARD and the MULTIMEDIA CARD are memory cards of the same specification, and they are compatible in most devices. Since the MMC card is more expensive, slower, and less stable than the SECURE DIGITAL CARD, the SECURE DIGITAL CARD is more predominantly used.

The SMART MEDIA CARD, an ultra-thin flash memory developed in the early days along with a COMPACT FLASH memory, is very inexpensive and small. It is preferred for use in compact digital cameras. However, it has a small capacity and since the memory area is exposed, it is very unstable.

In order to perform the aforementioned print functions, software for operating devices in the printer is needed. The software is provided individually for each print function. In the present invention, software for a set of print functions is referred to as a software block 30.

When the external memory 10 is mounted in the printer, the reader 23 reads the print function table stored in the external memory 10 and the authentication level of the external memory 10. Herein, the reader 23 individually determines the available print functions by reading the print function table and extracting information on the available print functions by correlating the print function table with the authentication level of the external memory 10.

The function setting unit 21 sets up the operability of software for each available print function, i.e., operability of each software, based on the available the print functions determined by the reader 23. For example, for a master-level external memory, the function setting unit 21 sets up all of the software in software block 30 to be operable. However, for a second-level external memory 10, as illustrated in FIG. 2, the function setting unit 21 sets up the operability of the software corresponding to the second-level print functions, such as, PS3 emulation, printing without margins, toner saving, and paper type.

The display 25 shows the authentication level of the current external memory 10 and whether software is set up to be operated, based on the information stored in the external memory 10. The display 25 also displays a message indicating that an external memory 10 is mounted or a message requesting that an external memory 10 be mounted. The mounting messages are displayed based on whether the external memory 10 is mounted or not during the initial operation of the printer.

Meanwhile, the controller 20 controls the reader 23, the function setting unit 21, and the display 25. The controller 20 determines whether the external memory 10 is mounted or not during the initial operation of the printer and, if the external memory 10 is mounted, it operates the reader 23. Otherwise, if no external memory 10 is mounted, it displays a message on the display 25 requesting to mount an external memory 10. Also, the controller 20 monitors whether there is a change in the authentication level of the external memory 10 by operating the reader 23 in real-time. This is done not only during the initial operation but also as long as power is supplied to the printer. If the external memory 10 is exchanged and there is a change in the authentication level of the external memory 10, the controller 20 displays a message on the display 25 requesting a user to reset the power of the printer.

Also, when the operability of the software is set up in the function setting unit 21, based on the result from the reader 23, the controller 20 controls the printer by operating only the software set up to be operated by the function setting unit 21 during the operation of the printer.

A printing process of the printer using the printer operation control system of the above structure will be described with reference to FIG. 4.

First, at step S110, a printer is initially operated. At step S120, a controller 20 senses whether an external memory 10 is mounted in a setup slot. If the external memory 10 is mounted, at step S130, the controller 20 operates a reader 23 to read an authentication level of the external memory and a print function table which are stored in the external memory 10 to thereby determine the availability of each print function.

Herein, if no external memory 10 is mounted, at step S125, the controller 20 displays a message on a display 25 requesting that an external memory 10 be mounted. If the external memory 10 is not mounted, the controller 20 stops the printer from operating after a predetermined time. If a manager wants to use the printer without mounting external memory 10, the manager can control the printer in a default state by inputting an authentication number to operate the printer.

When the availability of each print function is read out of the external memory 10 in the reader 23, the function setting unit 21 sets up only the software for the available print functions to be operable. At step S140, the information on the operability of the software is provided to the controller 20.

If a user inputs a print option together with print data in this state, the controller 20 determines whether the print option input by the user is an available print function for the printer. If the print option input by the user is operable, the controller 20 operates the corresponding software and outputs the print data. However, if the print option input by the user is not operable, the controller 20 disregards the print option input by the user, and prints the print data in a default state. In the alternative, the controller 20 can display a message on the display 25 that the printing cannot be carried out according to the inputted print option, thereby giving the user an opportunity for inputting another print option.

Meanwhile, at step S150, if the external memory 10 is changed in the middle of the printer's operation, at step S160, information on a new authentication level and print functions are read in the reader 23 in real-time. Then, at step S170, the controller 20 outputs a message on the display 25 requesting that a power button of the printer be used to reset the printer. When the user resets the power and operates the printer again, at step S180, the controller 20 determines the operability of each software according to the new authentication level and print functions, by operating the reader 23 and the function setting unit 21.

Figure 3:
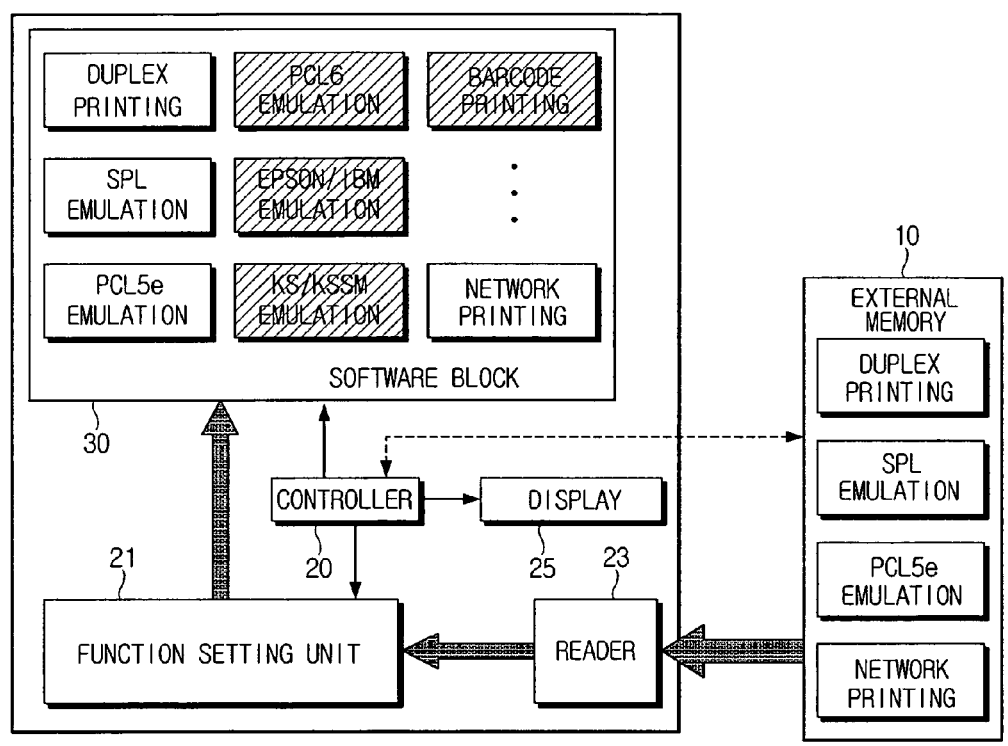
FIG. 3 is a block diagram illustrating a printer operation control system in accordance with another embodiment of the present invention.

Meanwhile, FIG. 3 is a block diagram describing a printer operation control system in accordance with another embodiment of the present invention.

As shown, differently from the previous embodiment where the external memory 10 stores both a print function table and a authentication level, an external memory 10 of the present embodiment stores only information on available print functions.

The external memory 10 of FIG. 3 stores information on duplex printing, SPL emulation, PCL5e emulation, and network printing. Thus, the shaded functions of a software block 30, i.e., PCL6 emulation, EPSON/IBM emulation, KS/KSSM emulation, and barcode printing, cannot be used.

Herein, SPL stands for Samsung Printer Language and the SPL emulation is provided for Samsung products.

The PCL5e emulation is an upgraded version of PCL5 that interactively communicates various states of a printer to a system and provides a user friendly interface when informing users of any errors or various system states.

Network printing is a function for having a plurality of user terminals print on one printer that is accessed through a network. The barcode printing function facilitates barcode printing. The PCL6 emulation is a version that steps up the output print quality by enhancing output speed and general graphic support. PCL6 emulation also reinforces the function of character combining. The EPSON/IBM emulation is developed for products by the EPSON and IBM companies. The KS/KSSM emulation supports DOS.

In the present embodiment, since no specific authentication level is assigned to the external memory 10 and since the external memory 10 only stores the available print functions, it is possible to fabricate an external memory 10 having customized print functions according to each user. For example, an external memory 10 having PCL6 emulation and barcode printing is provided to employee A, while an external memory 10 having network printing and duplex printing is provided to employee B. Therefore, it is possible to provide a printer having print functions suitable for the printing requirement and needed level of performance of each individual.

When the external memory 10 is mounted in the printer, the reader 23 reads the information on the available print functions, which includes duplex printing, SPL emulation, PCL5e emulation, and network printing, and provides the information to the function setting unit 21. The function setting unit 21 sets up the software corresponding to the above mentioned print functions into the operable mode.

As shown above, the printer operation control system using the external memory 10 limits the print functions of the printer by using the external memory 10. Thus, the printer's manager can select the print functions for a printer based on each employee's or department's printing requirement and needed level of performance. Thereby, the manager can improve the efficiency in printer management. For example, for an employee or department that does not need color printing or a high-quality graphic function, the cost of managing and purchasing a printer can be reduced and the printer can be more easily managed by not including the color printing function and an emulation function supporting high-quality graphics.

A printer manufacturer can control the specification of printers by manufacturing standard printers and then manipulating the external memory 10. Therefore, they can save production cost by simplifying the production line. Also, since they can instantly provide printers of any specification desired by users by simply replacing or modifying the external memory 10, they can satisfy the users and provide added convenience.

While the invention has been shown and described with reference to certain embodiments thereof, it will be understood by those skilled in the art that various changes in form and details may be made therein without departing from the spirit and scope of the invention as defined by the appended claims.

What is claimed is:

1. A system for controlling operation of a printer, the system comprising:
   a printer capable of performing a plurality of print functions, the printer comprising a plurality of software, each software for enabling a corresponding print function of the printer;
   an external memory detachably mounted on the printer, the external memory storing authentication information authorizing the printer to enable one or more sets of the print functions;
   a reader for reading information on the availability of the set of print functions authorized by the stored authentication information;
   a function setting unit for setting up operability of each software of the plurality of software corresponding to the set of print functions authorized by the stored authentication information based on the availability information read in the reader; and
   a controller for controlling the operation of the printer based on the operability of each software set up in the function setting unit;
   wherein all users of the printer have access to all of the print functions authorized by the authentication information stored in the external memory when the external memory is mounted on the printer; and
   wherein the plurality of print functions include at lest one print function among emulation, manual mode, printing on both sides, printing without margins, printing multiple pages on one page, toner saving and paper type setting.

2. The system as recited in claim 1, wherein the authentication information comprises one of a plurality of authentication levels, including a master authentication level that allows use of all of the plurality of print functions and generation of external memories of lower authentication levels with limited print functions.

3. The system as recited in claim 1, wherein the authentication information comprises only information of available print functions among the plurality of print functions.

4. The system as recited in claim 1, wherein the authentication information comprises an authentication level of the external memory and a table comprising a list of all of the plurality of print functions with an associated authentication level for each listed print function.

5. The system as recited in claim 1, wherein the external memory comprises a flash memory which comprises at least one of a MEMORY STICK, SECURE DIGITAL (SD) CARD, MULTIMEDIA CARD (MMC), MICRODRIVE (MD), COMPACT FLASH, and a SMART MEDIA CARD.

6. The system as recited in claim 1, wherein the printer includes a setup slot for mounting the external memory, and the setup slot is either located inside the printer so as to prevent the external memory from being easily manipulated, or located on the outside of the printer.

7. The system as recited in claim 1, wherein the controller is also for determining whether the external memory is mounted or not during initial operation of the printer.

8. The system as recited in claim 7, wherein the printer includes a display for showing an operational state of the printer, and the controller displays a message on the display requesting to mount the external memory when the controller determines that during the initial operation of the printer the external memory is not mounted.

9. The system as recited in claim 1, wherein the authentication information comprises an authentication level from a plurality of authentication levels, and wherein each set of available print functions of the plurality of print functions is mapped to one of the plurality of authentication levels and stored.

10. A method for controlling operation of a printer having diverse print functions by using an external memory, the printer capable of performing a plurality of print functions and having a plurality of software each operable for a corresponding print function of the plurality of print functions, the method comprising the steps of:
  a) preparing the external memory by storing in the external memory authentication information authorizing the printer to enable one or more sets of print functions to the printer, and detachably mounting the external memory to the printer;
  b) reading information on the availability of the set of print functions corresponding to the stored authentication information;
  c) setting up operability of each software of the plurality of software corresponding to the set of print functions corresponding to the stored authentication information based on the read availability information; and
  d) controlling an operation of the printer based on the operability of each software; and
  wherein all users of the printer have access to all of the print functions authorized by the authentication information stored in the external memory when the external memory is mounted on the printer; and
  wherein the plurality of print functions include print function among emulation, manual mode, printing on both sides, printing without margins, printing multiple pages on one page, toner saving and paper type setting.

11. The method as recited in claim 10, wherein the authentication information comprises one of a plurality of authentication levels including a master authentication level that allows use of all print functions and generation of external memories of lower authentication levels with limited print functions.

12. The method as recited in claim 10, wherein the stored authentication information consists of only information of available print functions among the plurality of print functions.

13. The method as recited in claim 10, wherein the stored authentication information comprises an authentication level of the external memory and a table comprising a list of all of the plurality of print functions with an associated authentication level for each listed print function.

14. The method as recited in claim 10, further comprising the steps of:
  e) sensing whether the external memory is mounted or not during the initial operation of the printer; and
  f) if the external memory is not mounted, requesting on a display that the external memory be mounted.

15. The system as recited in claim 1, wherein the authentication information comprises one of a plurality of authentication levels including an authentication level designated in the external memory to define a set of print functions of the plurality of print functions available to the printer when the external memory is detachably mounted on the printer and read to obtain information on the availability of the each print function.

16. The method as recited in claim 10, wherein the authentication information comprises one of a plurality of authentication levels including an authentication level designated in the external memory to define a set of print functions of the plurality of print functions available to the printer when the external memory is detachably mounted on the printer and read to obtain information on the availability of each print function.

17. The method as recited in claim 10, wherein the authentication information comprises an authentication level from a plurality of authentication levels, and wherein each set of available print functions of the plurality of print functions is mapped to one of the plurality of authentication levels and stored.

* * * * *